United States Patent
Taylor et al.

(10) Patent No.: US 10,113,644 B2
(45) Date of Patent: Oct. 30, 2018

(54) SELF-LUBRICATING AND DRAINING, CONTACTING FACE, ROTATING SHAFT SEAL

(71) Applicant: Parker-Hannifin Corporation, Cleveland, OH (US)

(72) Inventors: Charles Taylor, Roscoe, IL (US); Jesse Slagell, Nacogdoches, TX (US); Ron Thomas, Cayuga, NY (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 0 days.

(21) Appl. No.: 14/838,501

(22) Filed: Aug. 28, 2015

(65) Prior Publication Data

US 2016/0061331 A1    Mar. 3, 2016

Related U.S. Application Data

(60) Provisional application No. 62/043,678, filed on Aug. 29, 2014.

(51) Int. Cl.
*F16J 15/34* (2006.01)
*F16J 15/00* (2006.01)

(52) U.S. Cl.
CPC ........... *F16J 15/002* (2013.01); *F16J 15/342* (2013.01); *F16J 15/344* (2013.01)

(58) Field of Classification Search
CPC .... F16J 15/3404; F16J 15/344; F16J 15/3464; F16J 15/3496; F16J 15/3412; F04D 29/126; F04D 29/128
See application file for complete search history.

(56) References Cited

U.S. PATENT DOCUMENTS

| | | | | |
|---|---|---|---|---|
| 2,508,097 A | * | 5/1950 | Brown | F16J 15/3404 277/391 |
| 2,992,842 A | * | 7/1961 | Shevchenko | F01D 11/003 277/306 |
| 3,479,040 A | * | 11/1969 | Tracy | F16J 15/342 277/388 |
| 3,804,424 A | * | 4/1974 | Gardner | F16J 15/3412 277/360 |
| 3,869,135 A | * | 3/1975 | Diederich | F16J 15/3444 277/378 |
| 4,087,097 A | * | 5/1978 | Bossens | F16J 15/342 277/352 |
| 4,406,460 A | * | 9/1983 | Slayton | F16J 15/164 277/401 |

(Continued)

FOREIGN PATENT DOCUMENTS

WO    2014/107161    7/2014

*Primary Examiner* — Eugene G Byrd
(74) *Attorney, Agent, or Firm* — Renner, Otto, Boisselle & Sklar, LLP

(57) ABSTRACT

A shaft seal assembly and method for pressure relief in a shaft seal assembly includes a stator having a static seal and a rotor rotatable relative to the stator that has a rotating seal. The static seal has an end face in sealing engagement with an end face of the rotating seal. At least one of the static seal and the rotating seal includes an annular passage defined in the respective end face and at least one axial passage extending through the respective seal. Lubricant drains and fills through the at least one axial passage and the annular passage at the sealing surfaces of the end faces. The end faces maintain sealing engagement during rotation of the rotor.

13 Claims, 6 Drawing Sheets

(56) References Cited

U.S. PATENT DOCUMENTS

| | | | | |
|---|---|---|---|---|
| 4,413,830 A | * | 11/1983 | Pietsch | B63H 23/321 |
| | | | | 277/364 |
| 4,447,063 A | * | 5/1984 | Kotzur | F16J 15/342 |
| | | | | 277/304 |
| 4,928,978 A | * | 5/1990 | Shaffer | F01D 25/183 |
| | | | | 277/401 |
| 4,990,054 A | * | 2/1991 | Janocko | F04D 9/001 |
| | | | | 277/401 |
| 5,464,227 A | * | 11/1995 | Olson | F16J 15/3404 |
| | | | | 277/400 |
| 5,513,856 A | * | 5/1996 | Fondelius | F16J 15/3404 |
| | | | | 277/408 |
| 5,658,127 A | * | 8/1997 | Bond | F16J 15/3404 |
| | | | | 277/399 |
| 6,325,382 B1 | * | 12/2001 | Iwamoto | F16J 15/3404 |
| | | | | 277/368 |
| 8,167,314 B2 | | 5/2012 | Ullah | |
| 2005/0082765 A1 | * | 4/2005 | Khonsari | F16J 15/3404 |
| | | | | 277/359 |
| 2007/0296156 A1 | * | 12/2007 | Yanagisawa | F16J 15/3412 |
| | | | | 277/352 |
| 2008/0003099 A1 | | 1/2008 | Giesler et al. | |
| 2008/0042364 A1 | * | 2/2008 | Zheng | F16J 15/3444 |
| | | | | 277/378 |
| 2008/0106042 A1 | | 5/2008 | Roddis et al. | |
| 2008/0217861 A1 | * | 9/2008 | Sei | F16J 15/3404 |
| | | | | 277/385 |
| 2008/0217862 A1 | * | 9/2008 | Feigl | F16J 15/3404 |
| | | | | 277/388 |
| 2009/0134584 A1 | * | 5/2009 | Lederer | F16J 15/3464 |
| | | | | 277/369 |
| 2011/0109047 A1 | | 5/2011 | Tones et al. | |
| 2011/0227290 A1 | * | 9/2011 | Roddis | F16J 15/3404 |
| | | | | 277/408 |

\* cited by examiner

SELF-LUBRICATING AND DRAINING, CONTACTING FACE, ROTATING SHAFT SEAL

RELATED APPLICATIONS

This application claims the benefit of U.S. Provisional Application No. 62/043,678 filed Aug. 29, 2014, which is hereby incorporated herein by reference.

FIELD OF INVENTION

The present invention relates generally to seals, and more particularly to rotating shaft seals.

BACKGROUND

Seal assemblies are used between rotational components in various applications. Seal assemblies may be used to provide an air and/or liquid seal between a stator and a rotor in a rotational system. Examples of rotational systems include gearboxes, engines, pumps, transmissions, compressors, transfer cases, differentials, and roller mills. Rotating components in the rotational system generally require lubrication during operation and a seal assembly may be used to prevent lubricant leaks out of the rotational system. In a typical rotor and stator configuration, the rotor and stator are prevented from contacting one another. The rotor rotates at high speeds such that if a surface of the rotor contacts a surface of the stator, frictional heat develops that wears the parts and decreases efficiency of the rotational system. Thus, a non-contacting or labyrinth type seal is used to prevent lubricant leaks in the system.

The use of a non-contacting seal or labyrinth seal, however, has drawbacks. One drawback is that the lubrication eventually may leak out of the gap required to prevent contact of the rotor and stator. Another drawback is that the seal may be unable to prevent external environmental contaminants from entering the shaft seal assembly when exposed to extreme environmental conditions. Lastly, labyrinth seals may be inefficient in sealing across high pressure differentials.

SUMMARY

The present invention provides a shaft seal assembly having a contacting face seal between a rotor and a stator that is self-lubricating and self-draining. The present invention includes axial and annular passages defined in at least one face of the rotor and stator that allow lubricant to both fill and drain at contacting faces of the rotor and stator. The shaft seal assembly creates a seal between interior lubrication and an external environment to prevent contamination. The axial and annular passages located at the contacting faces also provide for low-pressure sealing between the rotor and stator.

A shaft seal assembly includes a stator, a rotor that rotates relative to the stator, a rotating seal that rotates with the rotor, and a static seal disposed in the stator. The static seal has an end face in sealing engagement with an end face of the rotating seal. At least one of the static seal and the rotating seal includes at least one axial passage extending through the respective seal and an annular passage defined in the respective end face, allowing a lubricant to drain and fill through the at least one axial passage and the annular passage at the sealing surfaces of the end faces. The end faces maintain sealing engagement during rotation of the rotating seal.

A method for pressure relief in a shaft seal assembly includes the steps of holding a stator having a static seal in a fixed position and rotating a rotor having a rotating seal relative to the stator, where the rotating seal has an end face in sealing engagement with an end face of the static seal. The method further includes the step of forming at least one axial passage in at least one of the rotating seal and the static seal and an annular passage in the corresponding end face, allowing a lubricant to drain and fill through the at least one axial passage and the annular passage at the sealing surfaces of the end faces, where the end faces maintain sealing engagement during rotation of the rotor.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
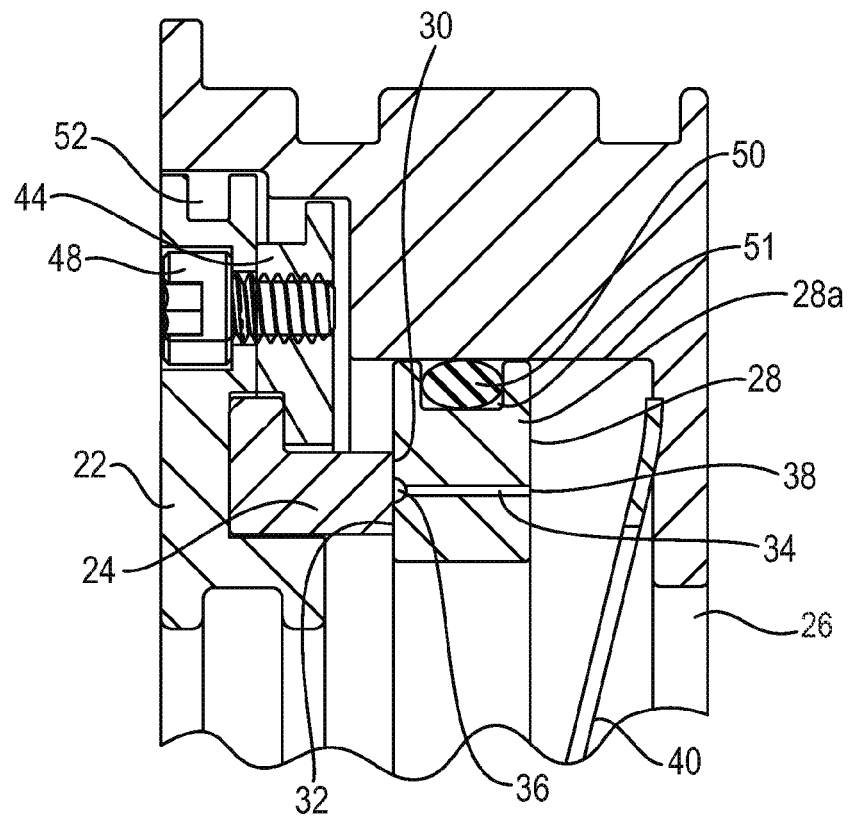
FIG. 1 is a cross-section view of an exemplary shaft seal assembly according to the present invention.

The principles of the present invention have particular application in rotational systems having at least one rotating component. An example of a rotating component is a rotor coupled to a rotating shaft that rotates relative to a stator that is a fixed portion of the rotational system. The present invention pertains to a shaft seal assembly for a rotational system having a stator, a rotor that rotates relative to the stator, a rotating seal that rotates with the rotor, and a static seal disposed in the stator. The static seal has an end face in sealing engagement with an end face of the rotating seal. The sealing engagement may include sealing contact between the end faces. The present invention includes at least one of the end faces having at least one axial passage extending through the respective seal and at least one annular passage defined in the respective end face. Lubricant drains and fills through the at least one axial passage and the at least one annular passage at the sealing surfaces of the end faces. The end faces maintain sealing engagement during rotation of the rotor and rotating seal. Embodiments of the present invention will now be described with reference to the drawings, wherein like reference numerals are used to refer to like elements throughout. It will be understood that the figures are not necessarily to scale.

Referring to FIG. 1, a shaft seal assembly 20 is contained within a rotational system (not shown) and includes a rotor 22 having a rotating seal 24 that rotates with the rotor 22, and a stator 26 having a static seal 28. The stator 26 may be pressed into a housing (not shown) of the rotational system, such as in a gearbox. The rotating seal 24 is a sealing surface portion of the rotor 22 that rotates with the rotor 22. The static seal 28 is disposed in the stator 26 and has an end face 30 in sealing engagement with an end face 32 of the rotating seal 24, creating a contacting seal between the rotor 22 and the stator 26.

Figure 2:
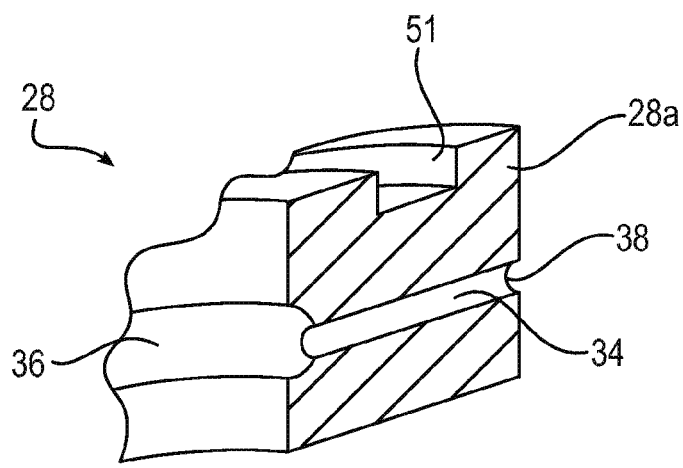
FIG. 2 is a detailed schematic of a portion of the exemplary shaft seal assembly in FIG. 1.

One of the rotating seal 24 and the static seal 28 may include at least one axial passage and at least one annular passage providing lubrication of the shaft seal assembly 20. Referring in addition to FIG. 2, the static seal 28 may include at least one axial passage 34 extending through a body 28a of the static seal 28, and at least one annular passage 36 defined in the end face 30 of the static seal. The annular passage 36 may be a groove, and the at least one axial passage 34 may include a plurality of axial openings circumferentially spaced apart in the body 28a of the static seal 28. The axial passages 34 may be parallel to a rotational axis of the rotor 22 and rotating seal 24 to optimize fluid flow through the axial passages 34 to the annular passage 36 during rotation of the rotating seal 24. The axial passages 34 may also be port holes drilled axially through the body 28a of the static seal 28. The rotating seal 24 and the static seal 28 may both include an annular passage. An advantage of providing an annular passage in both seals is limiting the wear on the seal. When both seals have annular passages, the fluid will flow to both passages instead of quickly filling one annular passage and potentially "choking" off the flow of lubricant.

In operation, lubricant enters the annular passage 36 through the axial passages 34. Lubricant may be introduced to an entry 38 of any one of the axial passages 34 by any mechanism that distributes oil within the rotational system. Examples of methods to introduce lubrication to the axial passages 34 include splashing, slinging, forced spraying or mist systems, pumping, or drip rails. The lubrication may be aided to the entry 38 by additional fluid passages. The additional fluid passages may include gutters, ducting, and any passages that direct lubricant to an intended contact point of the shaft seal assembly, such as the entry 38. When the rotor 22 is rotating at a lower speed or not rotating, lubricant drains from the annular passage 36 through axial passages 34 located at a lower portion of the shaft seal assembly 20, by way of gravitational force. When the rotor 22 is rotating at a higher speed, lubricant may drain through all axial passages 34, by way of centrifugal force. The lubricant drains back to a sump (not shown) in the rotational system. The lubricant may then be circulated through a filtering system in certain applications. Generally, lubricant may enter and exit any of the axial passages 34. An advantage of providing fluid passages that supply and drain lubricant at the contacting surfaces of the rotor and stator is that the seal is a low-pressure seal. The low-pressure seal will wear less quickly than other contacting seals.

As shown in the exemplary embodiment of FIG. 1, the shaft seal assembly 20 may include a biasing member 40 forcing the end face 30 of static seal 28 and the end face 32 of the rotating seal 24 into sealing engagement. The biasing member 40 may be a wave spring 40 engageable between the stator 26 and the static seal 28 that lightly compresses the end faces 30, 32 against each other. The end faces 30, 32 may also be forced into sealing engagement by pressure generated in the rotational system. The end faces 30, 32 may be forced into sealing engagement by any suitable method in a particular application. Suitable methods include springs, magnets, clamps, additional seals, or any combination thereof.

Each of the end faces 30, 32 may be formed of a soft or hard material. One of the end faces 30, 32 may be a soft face and the other of the end faces 30, 32 may be a hard face to further reduce friction and pressure in the shaft seal assembly 20. Providing a soft face may reduce wear in the shaft seal assembly by compensating for mechanical tolerances in the shaft seal assembly during operation or during assembly. In other exemplary embodiments, both end faces 30, 32 may be formed of the same material or materials having similar material properties, such as a similar hardness.

The shaft seal assembly 20 may include a rotating face clamp, or locking ring, 44 to couple the rotor 22 and the rotating seal 24 for uniform rotation of the rotor 22 and rotating seal 24. The rotating seal 24 is trapped between the rotor 22 and the rotating face clamp 44, and a fastener, such as a bolt 48, may be provided for securing the rotating face clamp 44 to the rotor 22. The stator 26 may include a secondary seal 50, such as an o-ring, to further seal lubrication in the shaft seal assembly 20 and maintain contact between the end faces 30, 32 of the static seal 28 and the rotating seal 24. The secondary seal 50 may be disposed in a seal groove 51 that may be defined in the static seal 28 or in the stator 26. The rotor 22 may also include at least one labyrinth 52 that allows contaminants that may have entered the seal from an external source to exit the shaft seal assembly 20 before reaching the axial seal faces 30, 32. The labyrinth 52 may be a groove defined on the periphery of the rotor 22. The labyrinth 52 may be defined between the periphery of the rotor 22 and a portion of the stator 26.

Figure 4:
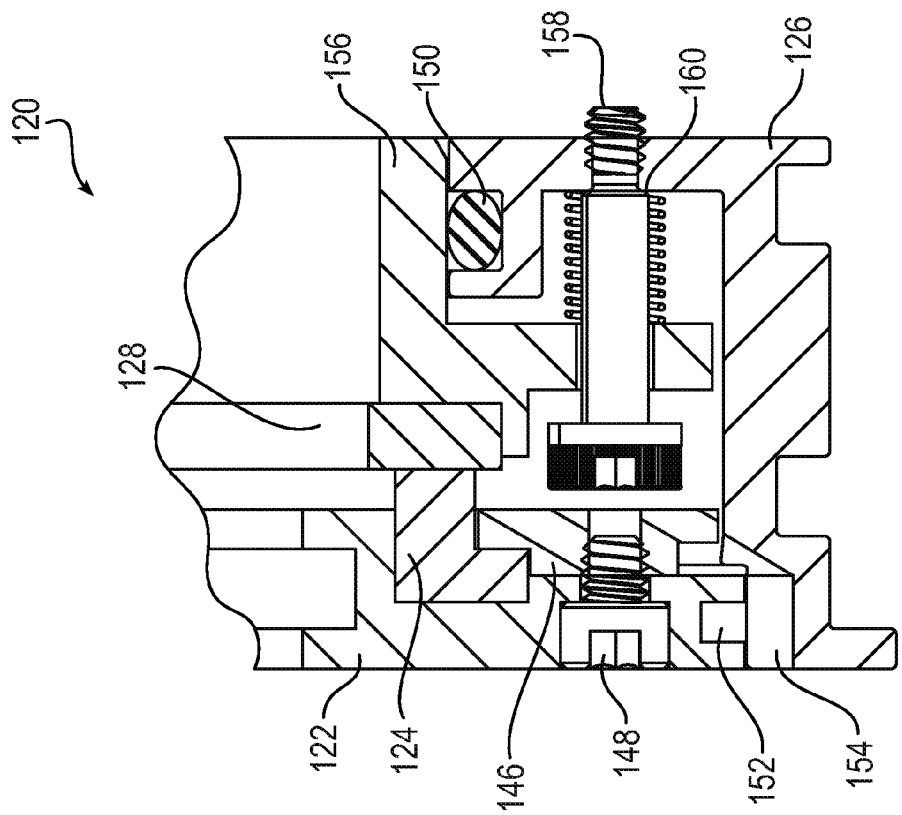
FIG. 4 is an enlarged view of the shaft seal assembly in FIG. 3.
Figure 3:
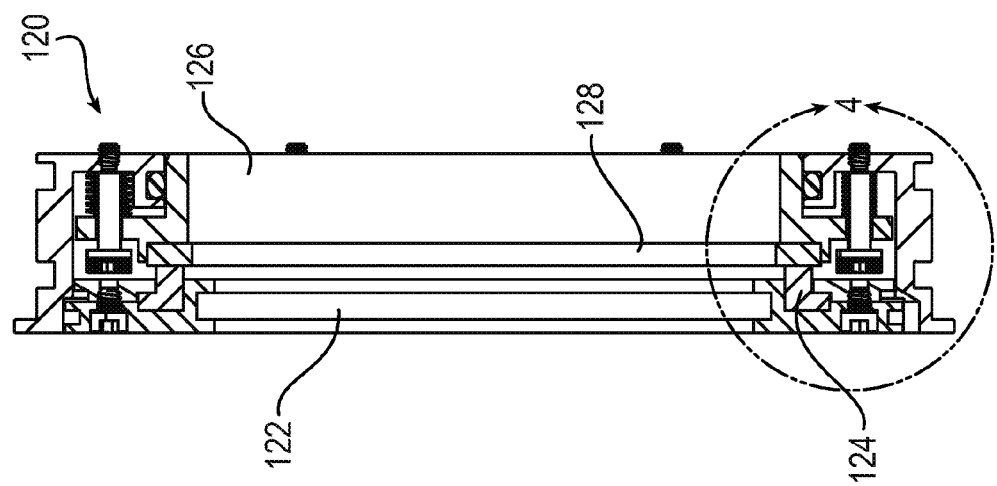
FIG. 3 is a cross-sectional view of a second exemplary embodiment of a shaft seal assembly according to the present invention.

Referring to FIGS. 3 and 4, a second exemplary embodiment of a shaft seal assembly 120 may include a rotor 122 and an external drain port 154. The rotor 122 may include a rotating seal 124 coupled to the rotor 122 by a rotating face clamp 126 and bolts 148, as previously described. The external drain port 154 may not be rotatable with the rotor 122 and rotating seal 124. The rotor 122 may also include a labyrinth 152 in fluid communication with the external drain port 154. The external drain port 154 may allow contaminants to fall out of the shaft seal assembly 120. A stator 126 includes a static seal 128 and a secondary seal 150 as previously described. The secondary seal 150 may seal a static face carrier 156 that supports the static seal 128 and the stator 126. The secondary seal 150 provides sealing of the static face carrier 156 and the static seal 128 if the static face carrier 156 and the static seal 128 have any axial movement or floating movement. The stator 126 may further include carrier guides 158 and compression springs 160 to compensate for axial or radial floating by biasing the static seal 128 and the static face carrier 156 towards the rotating seal 124. The seal assembly 120 may also include the previously described axial and annular passages (not shown) located in at least one of the rotating seal 124 and static seal 128. The second exemplary embodiment of the shaft seal assembly 120 allows for one seal to float and the other seal to be fixed such that the floating seal is self-adjusting if the rotating seal 124 and the static seal 128 are not perfectly parallel and concentric. Providing a secondary seal allows the seal assembly 120 to tolerate some degree of eccentricity and misalignment, while preventing leakage.

Figure 6:
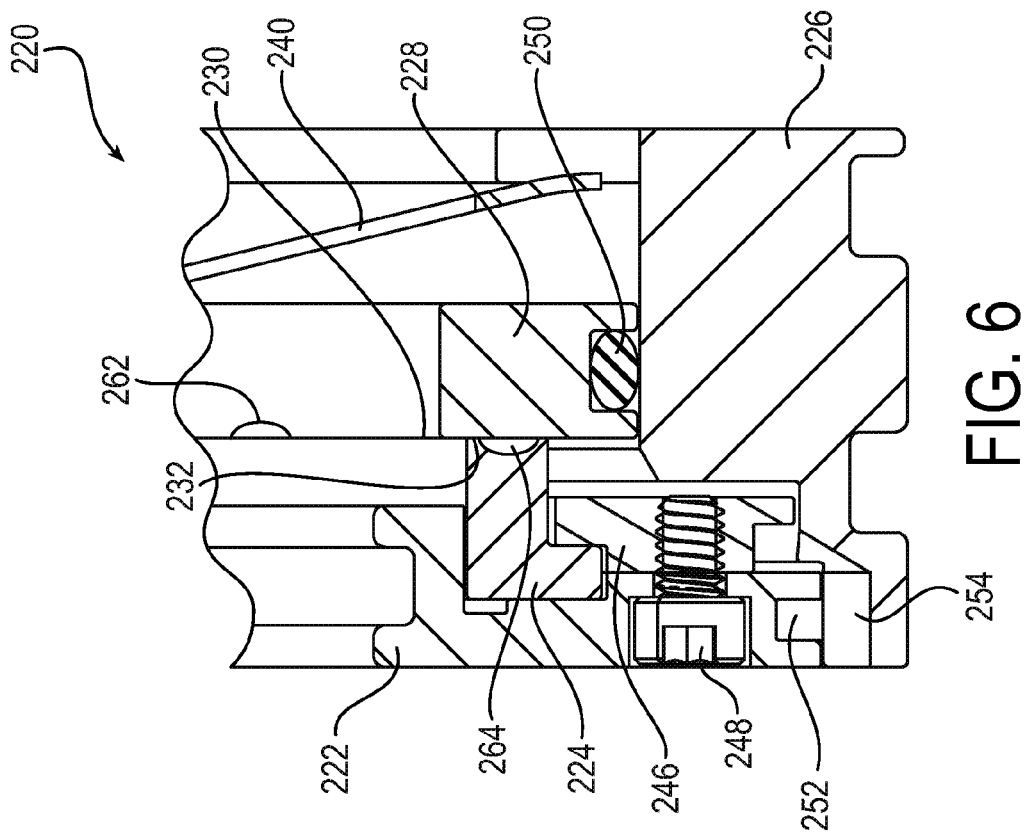
FIG. 6 is an enlarged view of the shaft seal assembly in FIG. 5.
Figure 5:
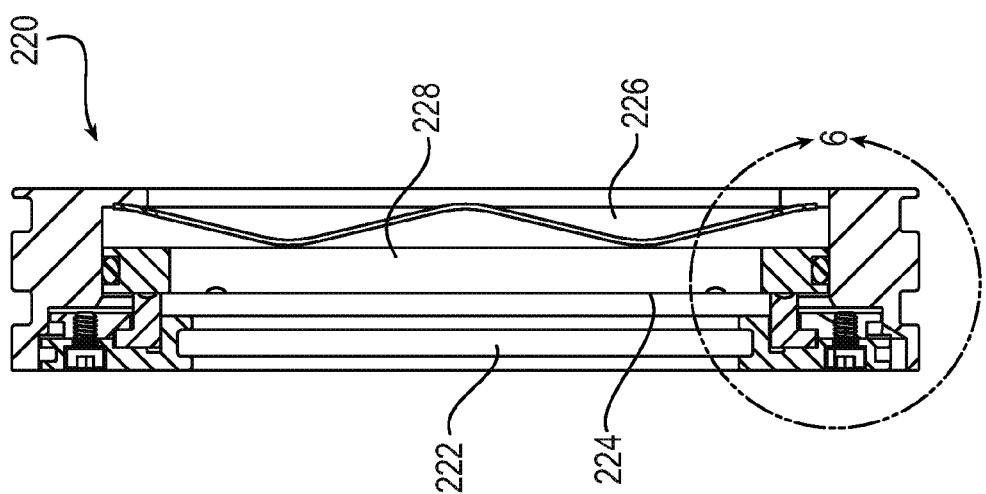
FIG. 5 is a cross-sectional view of a third exemplary embodiment of a shaft seal assembly according to the present invention.

Referring to FIGS. 5 and 6, a third exemplary embodiment of a shaft seal assembly 220 includes a rotor 222 having a rotating seal 224, a rotating face clamp 246, bolt 248, a labyrinth 252, and external drain port 254 as previously described. The shaft seal assembly 220 includes a stator 226 having a static seal 228 and secondary seal 250 that is positioned between the static seal 228 and the stator 226. The seal assembly 220 may also include the previously described axial and annular passages (not shown) located in at least one of the rotating seal 224 and static seal 228. The stator 226 also includes a wave spring 240 biasing the static seal 228 against the rotating seal 224. The static seal 228 and the rotating seal 224 may be forced into sealing engagement using any suitable method. The shaft seal assembly 220 may include magnetic elements 262, 264 associated with end faces 230, 232 of the stator 226 and the rotor 222, respectively. One of the magnetic elements 262, 264 attracts the other, pulling the end face 230 of the static seal 228 and the end face 232 of the rotating seal 224 into sealing engagement. Providing magnetic elements and a secondary seal allows the seal assembly 220 to tolerate some degree of eccentricity and misalignment between the rotating seal 224 and the static seal 228, while preventing leakage.

Figure 8:
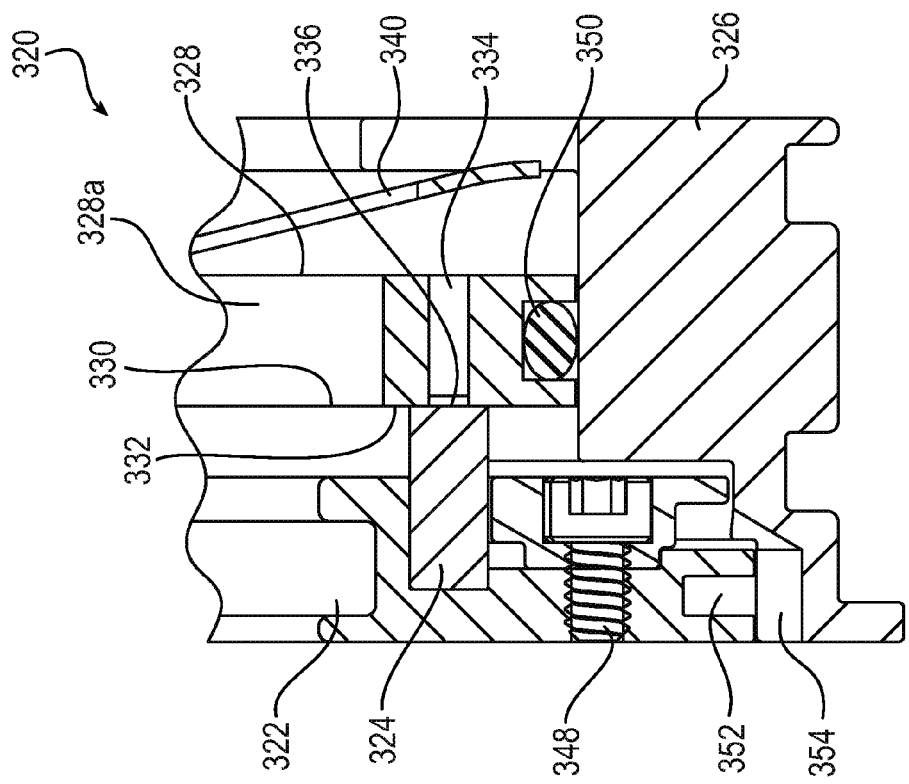
FIG. 8 is an enlarged view of the shaft seal assembly in FIG. 7.
Figure 7:
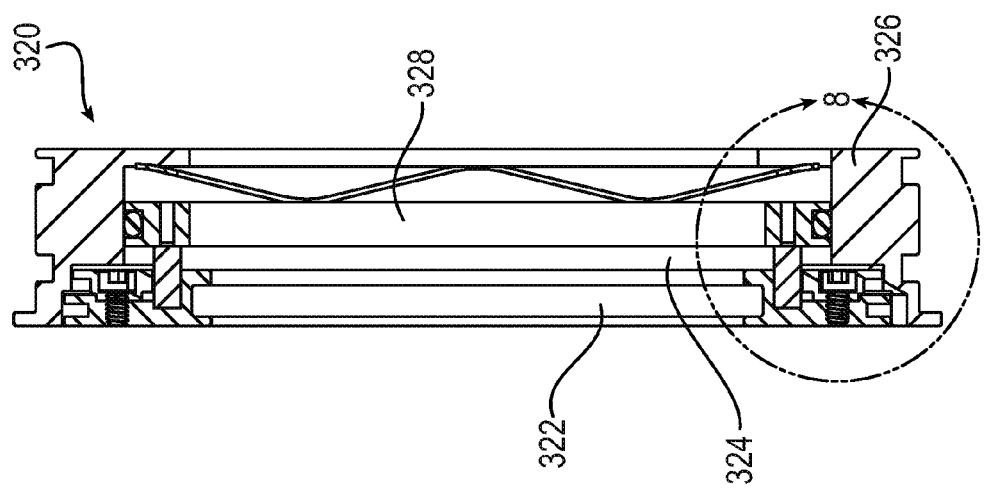
FIG. 7 a cross-sectional view of a fourth exemplary embodiment of a shaft seal assembly according to the present invention.

Referring to FIGS. 7 and 8, a fourth exemplary embodiment of a shaft seal assembly 320 includes a rotor 322 having a rotating seal 324 and bolt 348 securing the rotating seal 324 and the rotor 322 for rotation. The rotor 322 includes a labyrinth 352 in fluid communication with an external drain port 354 as previously described. The shaft seal assembly 320 includes a stator 326 having a static seal 328 and a secondary seal 350 is positioned between the static seal 328 and the stator 326. The stator 326 also includes a wave spring 340 biasing the static seal 328 against the rotating seal 324. The static seal 328 includes at least one axial passage 334 defined in a body 328a of the static seal 328 and parallel to an axis of rotation of the rotor 322 and rotating seal 324. The at least one axial passage 334 may include a plurality of circumferentially spaced openings. The static seal 328 includes an annular passage 336 defined in an end face 330 of the static seal 328. Lubrication may flow through the at least one axial passage 334 to the annular passage 336 to lubricate the rotating seal 324 at a contact point between an end face 332 of the rotating seal 324 and the end face 330 of the static seal 328. Lubricant may also drain from the at least one axial passage 334.

Figure 9:
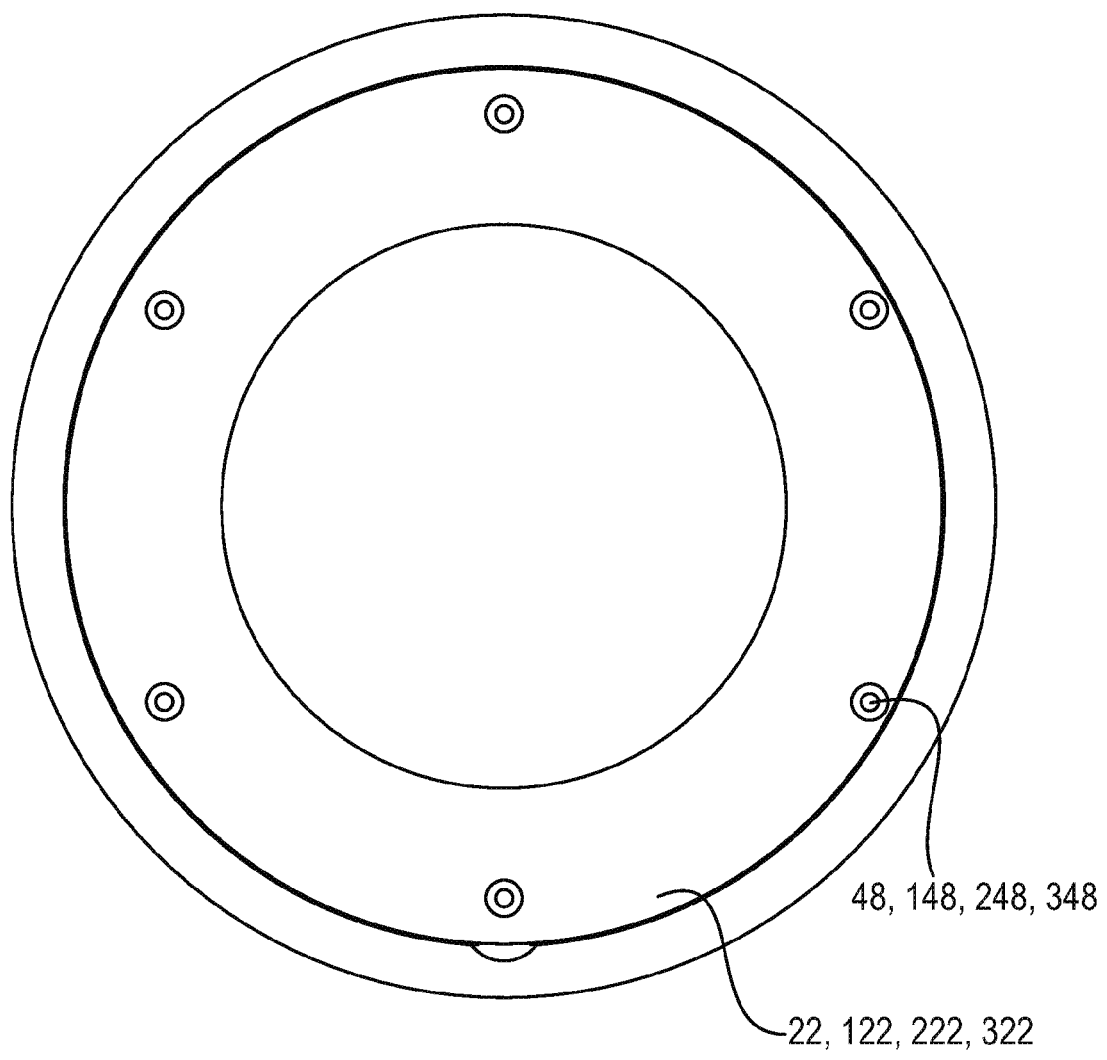
FIG. 9 is a front view of a shaft seal assembly according to the present invention.

Referring to FIG. 9, a front view of the shaft seal assembly 20, 120, 220, 320 is shown, insofar as with respect to pertinent features shown in FIG. 9, the differing embodiments have commonality. The shaft seal assembly 20, 120, 220, 320 includes a rotor 22, 122, 222, 322. Bolts 48, 148, 248, 348 for coupling the rotor 22, 122, 222, 322 to the rotating seal are also shown.

Figure 10:
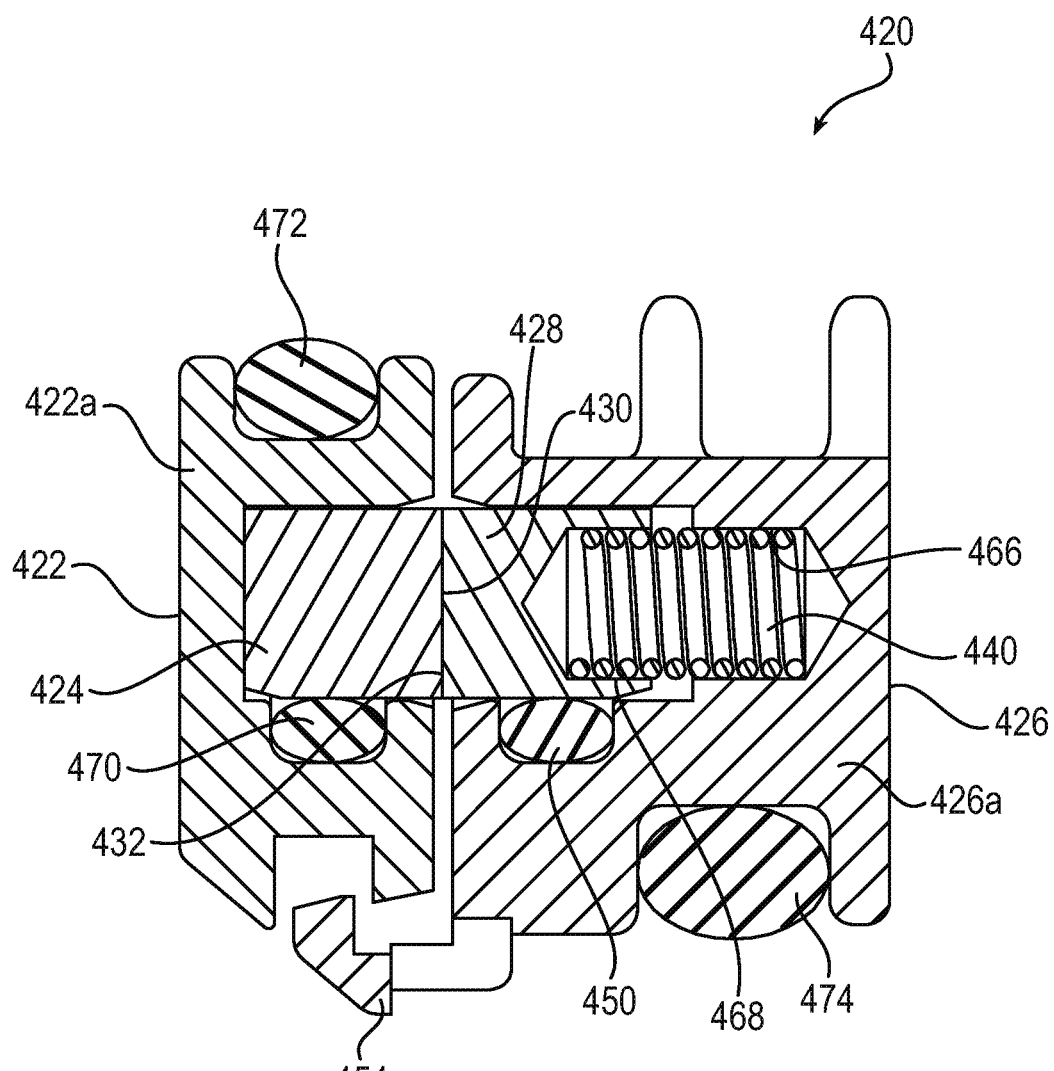
FIG. 10 is a cross-sectional view of a fifth exemplary embodiment of a shaft seal assembly according to the present invention.

Referring to FIG. 10, a fifth exemplary embodiment of a shaft seal assembly 420 includes a rotor 422 having a rotating seal 424 and an end face 432, all rotatable relative to a stator 426 having a static seal 428 and end face 430. The end faces 430, 432 maintain sealing engagement during rotation of the rotor 422. The seal assembly 420 may also include the previously described axial and annular passages (not shown) located in at least one of the end faces 430, 432. The shaft seal assembly rotating seal 424 and the static seal 428 form a unitary seal, where the rotating components and the stationary components are constrained from being axially separated relative to each other. The rotating seal 424 is constrained by a body 422a of the rotor 422, and the static seal 428 is constrained by a body 426a of the stator 426. The configuration of the fifth exemplary embodiment of the shaft seal assembly 420 further ensures the end faces 430, 432 maintain sealing engagement by restricting axial movement of the rotating seal 424 and the static seal 428. The The end faces 430, 432 are biased into sealing engagement by a biasing member 440. The biasing member 440 may be a compression spring engageable between the stator 426 and the static seal 428. The biasing member 440 may allow for axial floating of the static seal 428 to compensate for mechanical tolerances in the shaft seal assembly 420. The stator 426 may define an aperture 466 for receiving an end of the compression spring 440 and the static seal 428 may define an aperture 468 for receiving another end of the compression spring 440. The shaft seal assembly 420 also includes an expulsion port 454 for draining contaminants from the shaft seal assembly 420. The expulsion port 454 drains from at least one of the rotor 422 and the stator 426. The shaft seal assembly 420 also includes secondary seals 450, 470, 472, 474 that may include o-ring type seals. In the example configuration of FIG. 10, the secondary seal 450 is positioned between the static seal 428 and the stator 426. Another secondary seal 470 is positioned between the rotating seal 424 and the rotor 422. Other secondary seals 472, 474 may be positioned between the rotor 422 or stator 426 and a housing or other component in the rotational system. Any suitable secondary seal may be used for additional sealing of lubrication in the shaft seal assembly in a particular application. The embodiment in FIG. 10 is a unitized design, meaning the rotor 422 and stator 426 cannot be separated, making installation much simpler than a non-unitized design.

A method for pressure relief in a shaft seal assembly includes holding a stator having a static seal in a fixed position, rotating a rotor having a rotating seal relative to the stator, and forming at least one annular passage in one of the rotating seal and the static seal and at least one axial passage in the corresponding end face. The rotating seal has an end face in sealing engagement with an end face of the static seal. Lubricant flows through the at least one axial passage and the annular passage to drain and fill at the sealing surfaces of the end faces. The end faces maintain sealing engagement during rotation of the rotor.

The shaft seal assembly and method described herein may be used in any suitable rotational system, such as a system having a rotor rotating relative to a stator. Examples of suitable rotational systems include a gear box in a wind turbine, a gear box for a motor, or rotating components in a hermetic seal. The seal does not contact a shaft coupled to the rotor and may include a rotating soft face that seals against a static hard face for further reducing pressure in the system. The lubricant groove, which may be configured as an annular groove in a face of the static seal and a plurality of circumferentially spaced ports extending from the groove through the static face to an opposite face of the static seal, allows oil to be supplied to the end faces of the rotating seal and the static seal in sealing engagement. The lubricant groove also allows oil to drain out of the bottom of the shaft seal assembly and return to a fluid source, such as a sump.

A shaft seal assembly includes a stator, a rotor that rotates relative to the stator, a rotating seal that rotates with the rotor, and a static seal disposed in the stator. The static seal has an end face in sealing engagement with an end face of the rotating seal. At least one of the static seal and the rotating seal includes at least one axial passage extending through the respective seal and an annular passage defined in the respective end face, allowing a lubricant to drain and fill through the at least one axial passage and the annular passage at the sealing surfaces of the end faces. The end faces maintain sealing engagement during rotation of the rotating seal.

The static seal may include an annular groove in the end face and one or more axial openings extending through the static seal from the annular groove, whereby fluid flows through the one or more axial openings into the annular groove to lubricate the rotating seal. The openings may include a plurality of circumferentially spaced openings defined in the static seal. Each of the static seal and the rotating seal may have an annular passage.

The shaft seal assembly may further include a biasing member, where the end faces are forced into sealing engagement at least in part by the biasing member. The shaft seal assembly may include a resilient member engageable between the stator and the static seal that biases the static seal against the rotating seal. The resilient member may be a wave spring.

The shaft seal assembly may include magnetic elements associated with each of the end faces, where one of the magnetic elements attracts the other.

The shaft seal assembly may further include a static face carrier biased by a resilient member against the static seal to bias the static seal against the rotating seal. The shaft seal assembly may include a rotating face clamp, where the rotating seal is trapped between the rotor and the rotating face clamp. A fastener may be provided for securing the rotating face clamp to the rotor.

The rotor may include a labyrinth or a drain port for draining contaminants from the shaft seal assembly. The shaft seal assembly may include a secondary seal for sealing the static seal relative to the stator, where the secondary seal is disposed in a seal groove in the static seal or stator.

A method for pressure relief in a shaft seal assembly includes the steps of holding a stator having a static seal in a fixed position and rotating a rotor having a rotating seal relative to the stator, where the rotating seal has an end face in sealing engagement with an end face of the static seal. The method further includes the step of forming at least one axial passage in at least one of the rotating seal and the static seal and an annular passage in the corresponding end face, allowing a lubricant to drain and fill through the at least one axial passage and the annular passage at the sealing surfaces of the end faces, where the end faces maintain sealing engagement during rotation of the rotor.

The method may further include the steps of biasing the static seal against the rotating seal with a resilient member to hold the static seal in position and filling the annular passage with the lubricant to lubricate the shaft seal assembly, and draining the lubricant from the annular passage.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shaft seal assembly comprising:
a stator;
a rotor that rotates relative to the stator;
a rotating seal that rotates with the rotor; and
a static seal disposed in the stator, the static seal having an end face in sealing engagement with an end face of the rotating seal, wherein the end face of the static seal and the end face of the rotating seal are in contacting engagement during rotation of the rotating seal; and a spring that is adjacent the static seal and directly engages the static seal to bias the static seal against the rotating seal to maintain sealing engagement of the end faces by preventing axial movement of the rotating seal and the static seal during rotation of the rotating seal; wherein the static seal includes a first drain passage located at the contacting end faces, the drain passage being defined by at least one axial passage extending through the respective static seal and an annular passage defined in the respective end face, allowing a lubricant to drain and fill through the at least one axial passage and the annular passage at the sealing surfaces of the end faces, the end faces maintaining sealing engagement during rotation of the rotating seal; and
a second drain passage defined by a labyrinth formed in the rotor and an external drain port formed in the stator in communication with the labyrinth that maintain sealing engagement of the end faces by allowing contaminants to fall out of the shaft seal assembly.

2. The shaft seal assembly according to claim 1 further comprising a biasing member, wherein the end faces are forced into sealing engagement at least in part by the biasing member.

3. The shaft seal assembly according to claim 1, wherein one of the end faces has a soft face and the other end face has a hard face.

4. The shaft seal assembly according to claim 1, wherein the static seal includes an annular groove in the end face and one or more axial openings extending through the static seal from the annular groove, whereby fluid flows through the one or more axial openings into the annular groove to lubricate the rotating seal.

5. The shaft seal assembly according to claim 4, wherein the one or more openings includes a plurality of circumferentially spaced openings defined in the static seal.

6. The shaft seal assembly according to claim 2, wherein the spring biasing member is a wave spring.

7. The seal member according to claim 1 further comprising magnetic elements associated with each of the end faces, wherein one of the magnetic elements attracts the other.

8. The shaft seal assembly according to claim 1 further comprising a static face carrier biased by a resilient member against the static seal to bias the static seal against the rotating seal.

9. The shaft seal assembly according to claim 1, wherein each of the static seal and the rotating seal has an annular passage.

10. The shaft seal assembly according claim 1 further comprising a rotating face clamp, wherein the rotating seal is trapped between the rotor and the rotating face clamp.

11. The shaft seal assembly according to claim 10 further comprising a fastener for securing the rotating face clamp to the rotor.

12. The shaft seal assembly according to claim 1 further comprising a secondary seal for sealing the static seal relative to the stator, wherein the secondary seal is disposed in a seal groove in the static seal or stator.

13. The shaft seal assembly according to claim 1, wherein the static seal is biased against the rotating seal to maintain sealing engagement of the end faces by preventing axial movement of the rotating seal and the static seal during rotation of the rotating seal.

\* \* \* \* \*